(12) United States Patent
Vatti

(10) Patent No.: US 8,515,831 B2
(45) Date of Patent: Aug. 20, 2013

(54) PEOPLE'S TASK MANAGEMENT FRAMEWORK

(76) Inventor: Bala R. Vatti, Hudson, NH (US)

( * ) Notice: Subject to any disclaimer, the term of this patent is extended or adjusted under 35 U.S.C. 154(b) by 150 days.

(21) Appl. No.: 12/958,958

(22) Filed: Dec. 2, 2010

(65) Prior Publication Data

US 2011/0166963 A1 Jul. 7, 2011

Related U.S. Application Data

(60) Provisional application No. 61/292,069, filed on Jan. 4, 2010.

(51) Int. Cl.
  *G06Q 30/00* (2012.01)

(52) U.S. Cl.
  USPC ........... 705/27.1; 705/26.1; 705/4; 705/37; 705/307; 715/763; 715/853; 709/226; 717/109

(58) Field of Classification Search
  USPC ............ 705/26.1, 37, 27.1, 307, 4; 709/226; 715/763, 853; 717/109
  See application file for complete search history.

(56) References Cited

U.S. PATENT DOCUMENTS

| | | | |
|---|---|---|---|
| 5,544,302 A | | 8/1996 | Nguyen |
| 6,438,742 B1 * | | 8/2002 | McCann et al. ............. 717/109 |
| 7,340,484 B2 | | 3/2008 | S et al. |
| 7,379,888 B1 | | 5/2008 | Mahapatro |
| 7,523,385 B2 | | 4/2009 | Nguyen et al. |
| 7,698,276 B2 | | 4/2010 | Seshadri et al. |
| 7,747,966 B2 | | 6/2010 | Leukart et al. |
| 7,835,933 B2 | | 11/2010 | Casati et al. |
| 7,836,126 B2 | | 11/2010 | Thommes et al. |
| 2005/0149881 A1 * | 7/2005 | Proulx et al. .................. 715/853 |
| 2006/0015845 A1 * | 1/2006 | Tomchin ...................... 717/109 |
| 2007/0261026 A1 * | 11/2007 | Berger et al. ................. 717/109 |
| 2007/0294617 A1 * | 12/2007 | Kroeger ....................... 715/530 |
| 2010/0145801 A1 * | 6/2010 | Chekuri ..................... 705/14.51 |
| 2010/0280867 A1 | 11/2010 | Diaz et al. |
| 2010/0287014 A1 | 11/2010 | Gaulin et al. |

* cited by examiner

*Primary Examiner* — Yogesh C Garg

(57) ABSTRACT

The invention pertains to a system and method for people's task management developed with the concept of a system adapting to people's needs as opposed to people adapting to the solutions that were developed to address specific needs. The invention is based on classifying tasks into items produced and items consumed by entities such as individuals, groups of people, businesses and organizations, and then matching the entities based on the consumed items and the produced items, establishing communication paths to facilitate delivery of items from produced entities to consumed entities. The invention also describes a system for developing hierarchies of building blocks starting with the person as the basic building block. Higher level building blocks are formed by establishing alliances with lower level building blocks. Accommodating and streamlining the process of performing the people's tasks will result in significantly reduced overheads associated with people's task management.

10 Claims, 19 Drawing Sheets

Heads of arrows point to consumer entities and tails point to producer entities

Heads of arrows point to consumer entities and tails point to producer entities

PEOPLE'S TASK MANAGEMENT FRAMEWORK

CROSS-REFERENCE TO RELATED APPLICATION(S)

This application claims the benefit of U.S. Provisional Patent Application No. 61/292,069, filed Jan. 4, 2010, the contents of which are expressly incorporated herein by reference in its entirety.

FIELD OF THE INVENTION

The invention pertains to people's task management, more specifically a system that is adaptable to what people do and to accommodate their tasks.

BACKGROUND

People today are usually required to interact with multiple applications to complete a task. Between using search engines, email, cell phones, social networks, etc., a growing amount of work has gone into the usage of these applications. Each application may perform its function well; nevertheless, one still needs to interact with several of these applications separately in order to complete a task. The disconnected nature of these applications has forced people to adapt to the current situation and form ad hoc connections between them, each with its own associated overhead. Inherently, as the applications multiply, so does the overhead.

These as-needed solutions are problem-centric and developed for specific needs, each with a narrow scope. The problem-centric approach also resulted in multiple solutions to the same problem with some functional variations in the solutions. Some of these are easily available and some are not available to general public and hence a limited number of people use the solution sets. These adaptations may be adequate at best but still do not provide a unified and comprehensive solution.

The following shows some of the common solutions for specific purposes:
Business or personal communications: Gmail, Outlook, Thunderbird, SMS
Social or professional networking: Facebook, LinkedIn, MySpace, Twitter, IM
Information Search Google, Bing, Yahoo, Dogpile
Voice communications: Landline Phones, Mobile phones, VoIP
E-commerce: Amazon, EBay, Drugstore, Etrade, Paypal, Google Checkout
Travel, Food, Entertainment: Expedia, Open Table, Disney, Rentalpro
Event management: Cvent, Regonline, Eventsoft, Ennect, Evite
Calendar & time management: Effexis, VIP, Manictime, Outlook, iCal
Wiki platforms: Povo.com, Wikipedia.com
Project management: Microsoft Project, Ace Project, Easy Projects, Wrike
Inventory management: Inflow, Advance Pro, Fishbowl
Resource management: VPMi, OpenAir Usage of multiple applications may also need multiple accounts and passwords. These applications do not integrate seamlessly to provide combined benefit. A combination of these applications also leaves many gaps in accommodating a person's day-to-day tasks. In order to bridge these gaps higher level frameworks are built over existing solutions. For example, Web Services implementing the Service Oriented Architecture make functional building-blocks accessible over standard Internet protocols independent of platforms and programming languages. These services can represent either new applications or just wrappers around existing legacy systems to make them network-enabled. However, while these address some of the drawbacks and offer more flexible mechanisms, these frameworks also inherit most of the constraints and limitations imposed by the problem-centric approach.

For example, the following activities require use of multiple of the above applications and still have many gaps in the process:
Organizing a professional event—this requires identifying, notifying and registering participants, compiling the program activities, inviting and registering attendees, and following and managing the progress before, during and after the event.
Organizing a football tournament for schools within a state— this requires notifying students, forming teams and coaches, organizing practice sessions, scheduling games, tracking winning teams and constantly communicating with the people involved.
A physician starting a private practice in a new location—this requires finding a location, assembling staff, ordering furniture, material and equipment, advertising the practice, registering patients, scheduling appointments, tracking accounting and more.

Therefore, it would be beneficial if there is a people-centric system that adapts to the people's needs in performing day-to-day tasks as opposed to people adapting to the solutions developed around specific perceived problems. It would also be beneficial if such a system allows people to incrementally migrate to the system at their convenience.

SUMMARY OF THE INVENTION

Any task of a person can be classified as one of the following:
1. Consuming an item, which can be a goods or a service
2. Producing an item, which can be a goods or a service
3. Formation of an alliance
In addition, any task of an alliance can also be classified as one of the above three.

With the concept of alliance forming an alliance, hierarchies of alliances can be formed. By having the same external representation for both individual persons and for alliances or group of persons, the system developed around these concepts will be infinitely scalable both horizontally and vertically. The system supports the important role of exchanging the information to streamline the performance of the tasks. The system includes the concept of building blocks, person being the basic building block and the alliances being the composite building blocks. Alliances or vertical expansions are achieved by defining parent-child relationships and for horizontal expansions are done through peer-to-peer relationships.

The following are some of the examples indicating how tasks can be divided into produced and consumed items. It is to be noted that the produced items and the consumed items listed for each example are only exemplary and not exhaustive. In addition, it is not necessary to use the system for all the produced and consumed items of an entity and the entity can selectively migrate to the system at its convenience.

Example 1

Comprehensive Building Services Company

Consumes: engineers, architects, material suppliers, construction people
Produces: consulting, planning, architecture, construction services

Example 2

Football Coach Forming Football Team

Consumes: Football players
Produces: Football team

Example 3

Restaurant

Consumes: receptionist, waiters, cooks, food products, facility
Produces: restaurant services

Example 4

A Group of Friends

Consume: friends, recreational activities
Produce: None or not applicable

Example 5

Car Dealership

Consumes: New cars (wholesale), car parts, sales staff, service staff
Produces: New cars (retail), car services

Example 6

A use case of an exhibition for medical products in a hotel in a hotel conference hall. It is assumed that the hotel provides all the necessary equipment and supplies for the exhibition.
Entity 1: Organizer
Consumes: Hotel Services
Produces: Exhibitor Services, Attendee Services
Entity 2: Hotel Services
Consumes: NA
Produces: Conference room, booth building, carpeting, electrical services
Entity 3: Exhibitors
Consumes: Exhibitor services
Produces: NA
Entity 4: Attendees
Consumes: Exhibitor services
Consumes: Courses
Produces: NA
Entity 5: Instructors
Consumes: Exhibitor Services
Produces: Courses
FIGS. 16a, 16b and 16c show additional details of Example 6.

Example 7

Another Use Case for a Just in Time Product Manufacturing (JIT Co) and Marketing Entity 1: JIT Co
Consumes: Material, finishing, temp workers, shipping services
Produces: Products
Entity 2: Customer
Consumes: Products
Produces: NA
Entity 3: Temp Co
Consumes: NA
Produces: Temp workers
Entity 4: Material Co
Consumes: NA
Produces: Material and parts
Entity 5: Finishing Co
Consumes: NA
Produces: Finishing Services
Entity 6: Shipping Co
Consumes: NA
Produces: Shipping Services
FIGS. 17a, 17b and 17cc show additional details of Example 7.

Example 8

Inventory Management Example

Entity 1: Furniture Rental Company
Consumes: Furniture from sales outlets
Produces: Furniture rental services
Entity 2: Customer
Consumes: Furniture rental services
Produces: NA System maintains inventory of products or goods produced or consumed by an entity. When an entity consumes a product, the product's inventory gets decremented by the producing entity and incremented by consuming entity as needed. In cases of businesses such as Furniture Rental Company above, when a customer rents an item, the item's inventory is decremented when rented, and incremented when returned by a customer.

DETAILED DESCRIPTION AND PREFERRED EMBODIMENTS

Figure 1A:
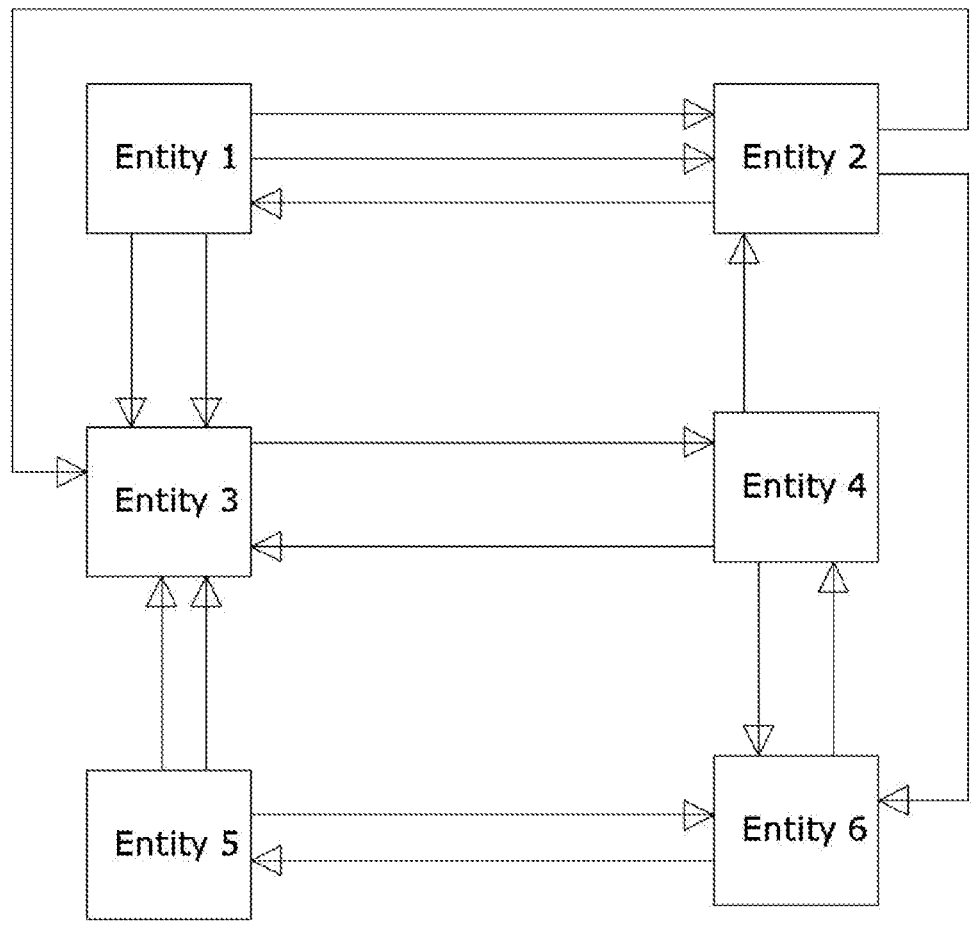
FIG. 1a shows entity relationships as a directed graph with arrows pointing from producers to consumers

The following definitions are used to describe the invention presented:

Task: Activity performed in the form of message and data exchange to facilitate delivery of an item from its producing entity to its consuming entity.

BBB: Basic building block, which is a person.

CBB: Composite building block formed with a combination of basic or other composite building blocks.

CBBn: Composite building block with degree n, where n is an integer>=0. The hierarchies in a composite building block may be formed by defining parent-child relationships.

Entity: A single person, a group of people, a business, an organization or an institution. Each building block is an entity.

Parent-child relationship: If entity X depends on, owned by or is controlled by another entity Y for its functioning, then the entity X is a child of entity Y. This is similar to employee-employer relationship. A child can have multiple parents, which is similar to an employee working part time for two employers. This is usually a long-term relationship. Hierarchies of alliances are formed by parent-child relationships.

Peer-to-peer relationship: If the relationship is not parent-child relationship it is peer-to-peer relationship. The system expands horizontally with peer-to-peer relationships. Peer-to-peer relationships may be graphically represented as directed graphs with arrows pointing from producing entity to consuming entity. These can be a long term, short term or temporary relationships.

GTMS: Generic task management system. All the entities or the building blocks communicate through a GTMS and it maintains relationships, facilitates effective communications between all the entities involved and provides necessary functionality for the operation of the system.

Child entity: An entity or a building block contained in a CBB and the relationship between the two is parent-child relationship.

Parent entity: A container entity of a child entity. A child entity can have multiple parent entities.

A person's or entity's activities can be broadly categorized and listed as follows:

1. Consumes Items
   1.1. Search for producing entities based on requirements.
   1.2. Selection from the available producing entities.
   1.3. Exchange data with the producing entities and receive the items.
   1.4. Optionally announcing for the items needed.
   1.5. Scheduling, organizing and monitoring items of interest.
   1.6. Specifying the dependency between items if exists.
2. Produces Items
   2.1. Create Items being offered.
   2.2. Publish item details (including status, lead time, item type, and other specific data).
   2.3. Acknowledge or accept consumers.
   2.4. Exchange data with consumers and supply the items.
   2.5. Optionally advertise items as needed.
   2.6. Optionally get feedback and rating from the consumers.
3. Forms Alliances
   3.1. Adjoin entities representing each alliance.
   3.2. Create an entity representing each alliance.

Building Blocks of the System:

A person consumes items, produces items or does both. Person is the basic building block of the system. Conceptually, the basic building block shown in FIG. 1 has the following components:

Head is interface and defines identity and specific behavior and data about the building block.

Producing Arm with 0 or more instances, each instance producing a different item.

Consuming Arm with 0 or more instances, each instance consuming a different item.

Multiple people independently consume items produced by others, and produce items for consumption by others. The basic building blocks can function independently.

The basic building blocks can also form an alliance and become a composite building block (CBB). This is similar to a group of people forming a business. Then the alliance as a whole becomes capable of producing, consuming or both, and can be viewed as having characteristics of the basic building block. This means the composite building block will have a head, producing and consuming arms just like the basic building block.

Tree structure: One of the ways of representing the alliance concept is using a tree structure. Typically organizations function like a tree structure having certain depth. The degree of a composite block is defined as the maximum depth of the composite block to the leaf level basic building blocks. The degree of BBB is 0 (zero), which can also be denoted as CBB0. The degree of a CBB is one more than the highest degree of the building blocks the CBB is composed of. A composite building block with any degree will have a Head, Producing and Consuming arms similar to BBB. All the building blocks communicate with the GTMS for their functioning, which means a CBB communicating with the GTMS also means all the building blocks within the CBB also communicate with GTMS. There can be peer-to-peer relationships within an alliance, which is similar to multiple departments reporting to the same manager may all be having peer-to-peer communications.

In practice, a larger organization can be represented with a CBB of a higher degree. For example, an organization with several divisions, subdivisions, departments, teams and individuals can be represented by a CBB5 with individuals at CBB0, teams at CBB1, departments at CBB2, subdivisions at CBB3, the divisions at CBB4 and the organization at CBB5.

Directed graph structure: Peer-to-peer relationships between entities can be represented as a directed graph, arrows between the entities pointing from producing entity to consuming entity. Each arrow represents an item.

The GTMS could also be a network of multiple systems to balance the load, increase the response time and to accommodate needed security through suitable partitioning of the systems. An organization may want to shield its traffic from the rest of the world, in which case a separate GTMS server farm could be used to manage all the internal tasks and have controlled access from outside, while having full access to the outside system.

Figure 1B:
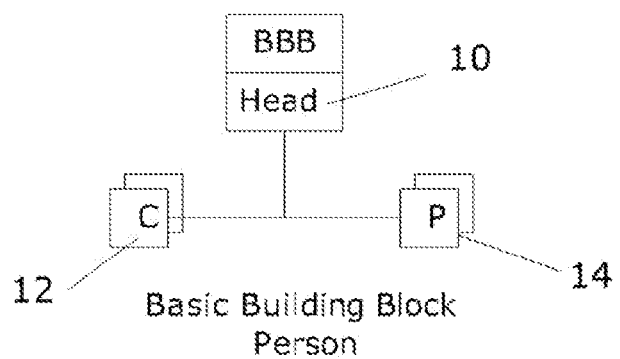
FIG. 1b shows a basic building block (BBB or CBB0), which is a person

FIG. 1 depicts the basic building block or BBB, which is a person. This can also be represented as a composite building block of degree 0 or CBB0. The basic building block has a head 10, one or more instances of consuming arm 12, and one or more instances of producing arm 14. Head is the interface to the system and also provides specific identity and behavior. Every task performed by a person can be classified as an item produced or an item consumed.

Figure 2:
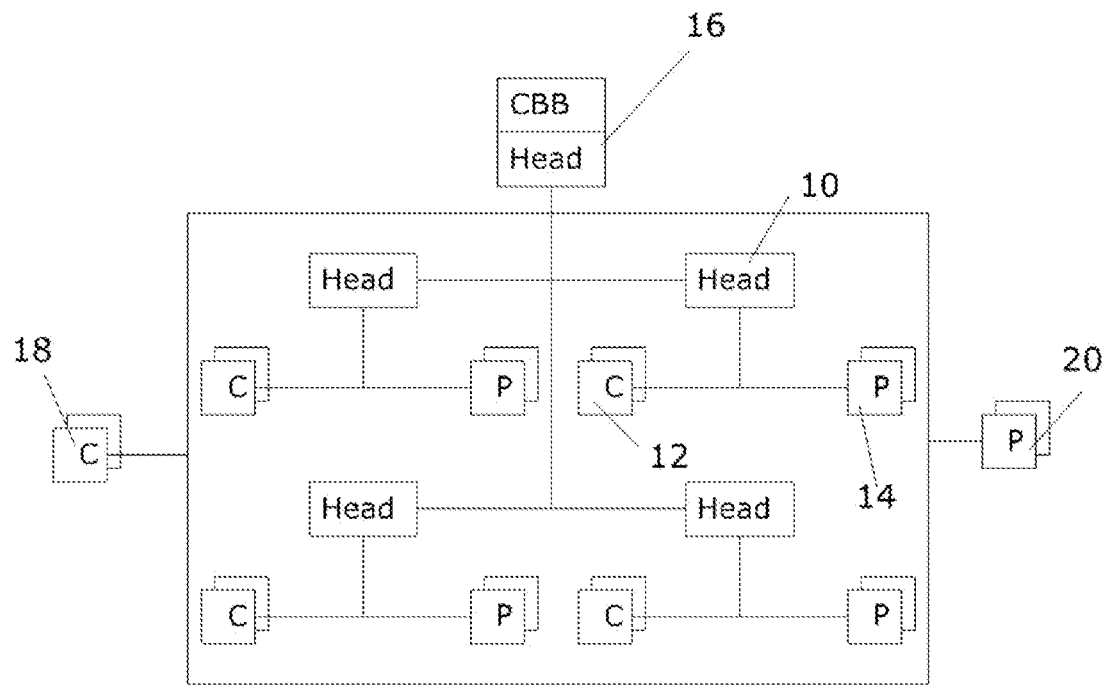
FIG. 2 shows a composite building block (CBB) formed by the basic building blocks (BBB)
Figure 3:
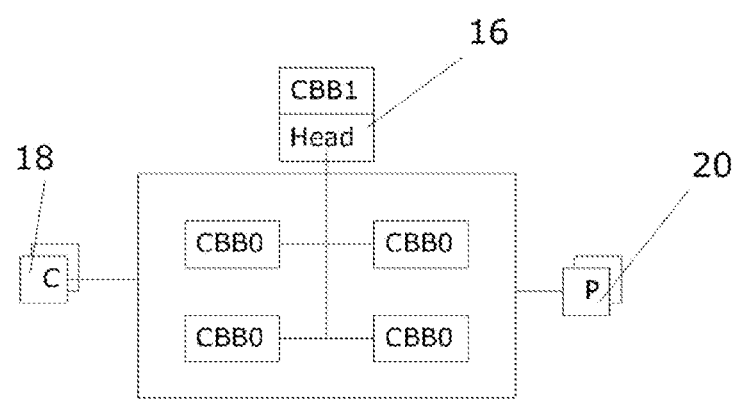
FIG. 3 shows a first degree composite building block (CBB1) formed by the basic building blocks (BBB)
Figure 4:
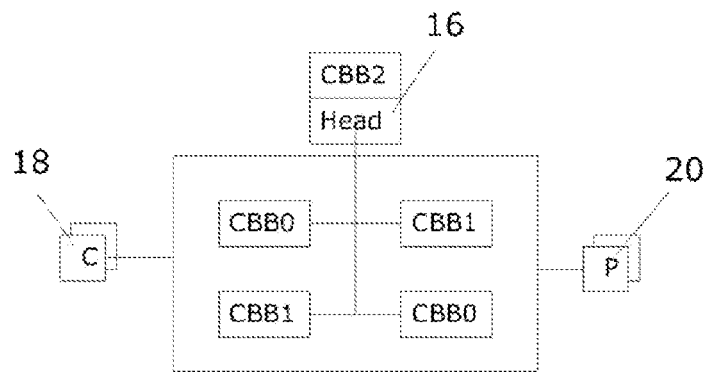
FIG. 4 shows a second degree composite building block (CBB2) formed by CBB1 and optionally CBB0

FIG. 2 shows a composite building block, CBB, with four basic building blocks. The CBB also has a head 16, zero or more instances of consuming arms 18, and zero or more of producing arms 20. Externally, the composite building block, CBB, looks exactly the same as the basic building block BBB and hence the manner of interacting with the CBB is the same as that of BBB. Since the CBB is composed of BBB entries or CBB0 entries, the degree of the CBB is 1 so it is represented as CBB1. Also, there may not be any relationship between the consuming arms and producing arms of the child entries of a CBB and its own consuming arms and producing arms. For example, a CBB may consume items produced by its child entities and produce entirely different items. FIG. 3 shows a simpler representation of CBB1 shown in FIG. 2. FIG. 4 illustrates a CBB of degree 2 or CBB2 since the highest degree of its child entries is 1. CBB2 interacts with CBB0 entries and CBB1 entries in the same manner. Externally, the CBB1 has a head 16 along with its consumption arms 18 and production arms 20.

Figure 5:
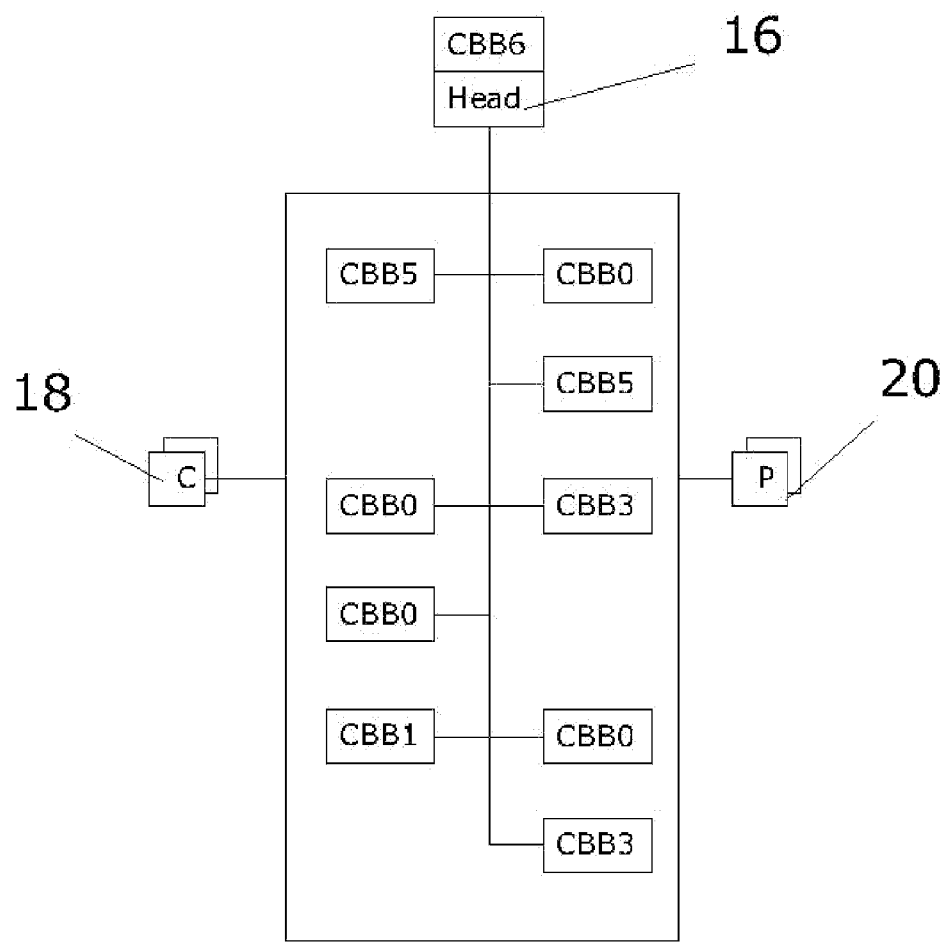
FIG. 5 shows a sixth degree composite building block (CBB6) formed by CBB5 and optionally CBB4 through CBB0

FIG. 5 shows a CBB of degree 6, CBB6, since the highest degree of its child entries is 5. Note that it is not necessary to have all the lower degree CBB entries. In this example, CBB2 and CBB4 are missing. The CBB6 also has a head 16, consuming arms 18 and producing arms 20.

Figure 6:
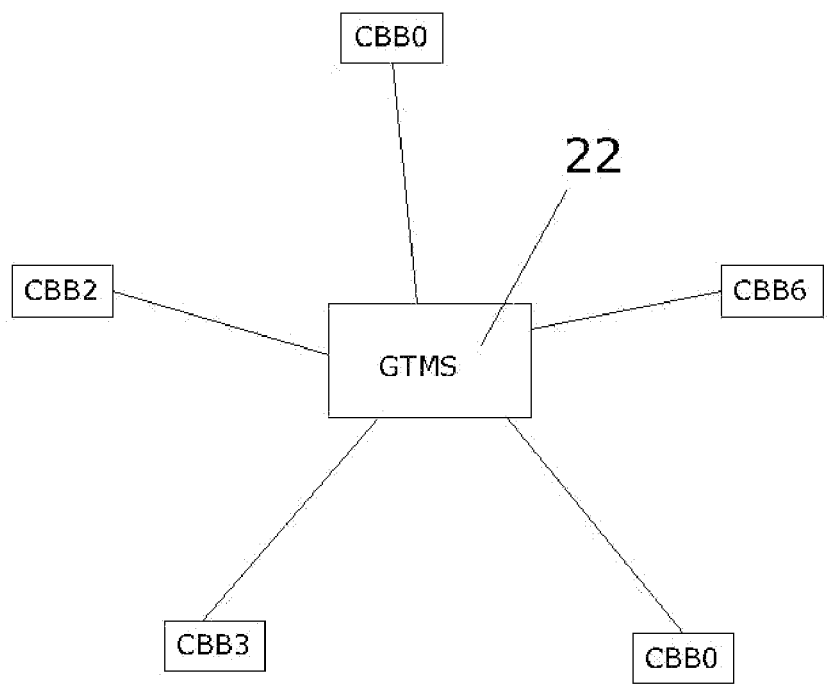
FIG. 6 shows multiple building blocks connected through a generic task management system (GTMS)

FIG. 6 illustrates a generic task management system, GTMS 22 communicating with five other entities of different degrees. Note that the communication channels are logical paths. All the entities of a CBB along with grandchildren down to the basic building blocks directly communicate with the GTMS to perform their tasks effectively. Any entity may be able to communicate with any entity of any degree through the GTMS. In addition, any entity may have the ability to restrict access to other entities.

Figure 7:
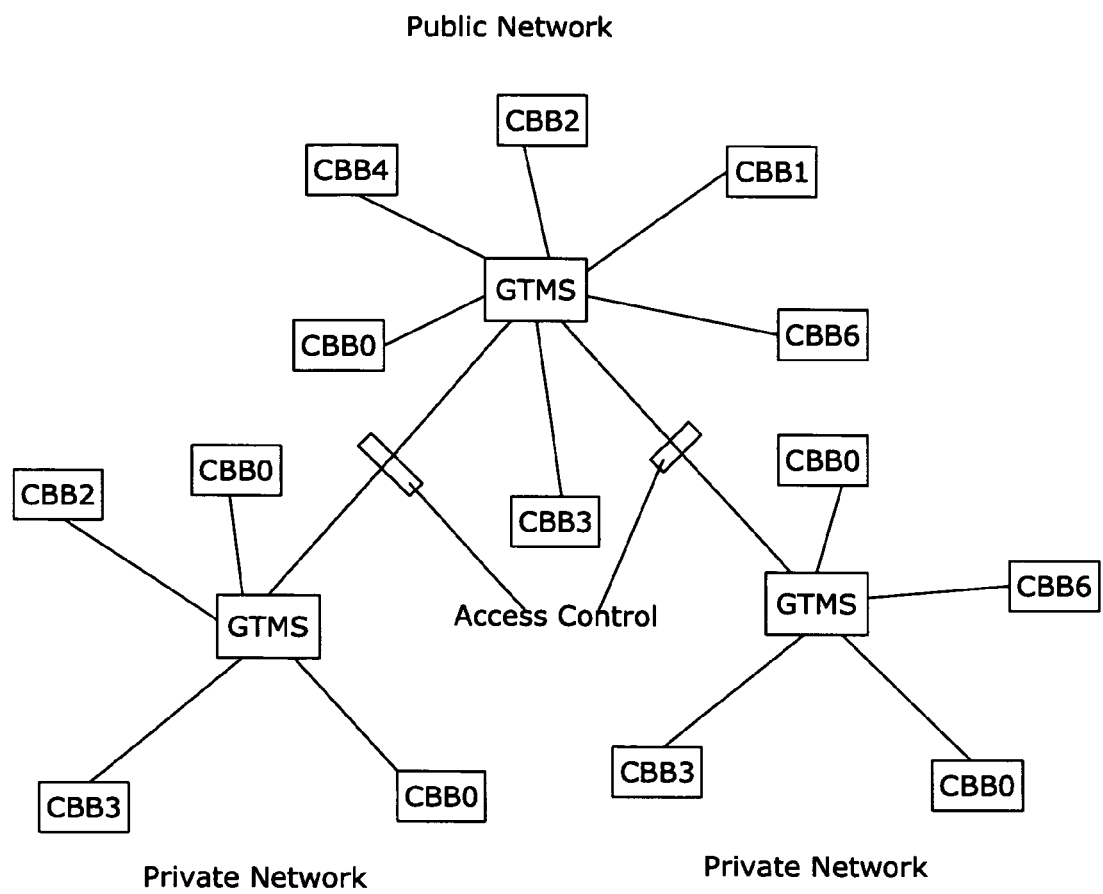
FIG. 7 shows an example of GTMS network for scalability, performance, security and logical functional partitioning

FIG. 7 shows a distributed GTMS network. Multiple GTMS systems 22 can cooperate and provide services with improved quality. A GTMS can also be partitioned for providing controlled access. Entities from a public network may not be able to access entities in a private GTMS network; however, the private GTMS may be able to access entities in the public network.

In order to support effective task management, the system also includes the following:

1. A search mechanism to find entities producing the items of interest using various search criteria. Users can select and interact with the entities found.
2. Publishing or advertising of items by the producing entities so that the interested consumers of the items can find and interact with the producing entities.
3. Provide persistent communication paths as needed between consumers and producers towards streamlining data and message exchange.
4. Execution of selective tasks in a predetermined sequence using pre or post task executing conditions.
5. Allows communication paths over the Internet, mobile phones and other available communication means.
6. Provide business intelligence queries, report generation and activity history recall by recording such fields as the producing entity, consuming entity, purpose, time and location. This also eliminates mundane bookkeeping or repetitive action overheads, since the system keeps track of all the pertinent information.
7. Allows to be used independently in a private network such as a large organization for its internal use to streamline task management.
8. The system connects the consumer side calendar with the producer side calendar for the scheduled tasks and interacts with all the entities involved when there are additions, modifications or deletions of tasks in order to smoothly accommodate the changes. This mechanism also accommodates several dependent tasks to be scheduled easily and help track the progress in real time.
9. Identify consumers or producers based on specific locations. The system is also effective when the users or their service locations change.
10. Offers E-commerce by providing reliable and secure transactions as needed.
11. Provides flexible notification mechanism, whereby users can define parameters and expressions for notification criteria.
12. Includes inventory management and resource management.
13. The system allows sharing a selective portion of entity specific data with other selected entities as needed.

Figure 8:
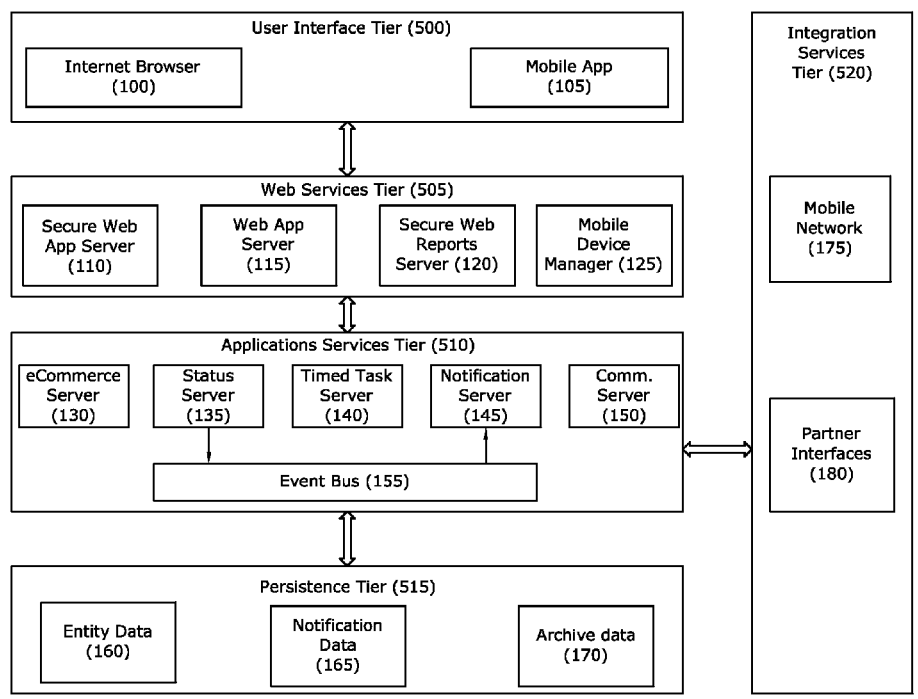
FIG. 8 shows an exemplary high level system architecture

Embodiments of the invention provide a system having a novel solution to people's task management. FIG. 8 depicts the high level system architecture. User Interface Tier 500 consists of standard internet browsers 100 and custom applications 105 for mobile and internet devices. These are the primary front-end components allowing communication between the entities and the system. The user interface tier communicates with Web Services tier 505 using HTTP/HTTPS protocol. Web Services Tier 505 hosts the Secure Web Application Server 110 that allows secure HTTPS connections to the Application Services Tier 510, the Web Application Server 115 that allows regular HTTP connection to the Application Services Tier, Secure Web Reports Server 120 that is used for report generation, Mobile Phone Locator 122 determines the current location of a mobile phone by interacting with mobile service providers and mobile device manager 125 that provides mobile user context for the rest of the components. The Web Services tier communicates with the Application Services tier 510 using XML/HTTP protocol. Optionally, surrounded by two firewalls, one restricting access from the internet, and the other restricting access to the application services tier, the system creates a demilitarized zone. This tier can be scalable independent of the rest of the tiers.

Application Services Tier 510 consists of Ecommerce Server 130 that allows secure financial transactions through external payment gateways using SOAP, Status Server 135 that handles the task management logic of the system with the help of Timed Tasks Server 140, Notification Server 145, Communications Server 150 and Event Bus 155. Accessible by the trusted servers of the web services tier, allowing access through XML over HTTP/HTTPS ports. This tier is computationally intensive and independently scalable.

Persistence Tier 515 allows for persistence of system data such as Entity Data 160, Location Data 162, Notification Data 165, Archive Data 170 and Activity Log 185. Access to the persistence tier is through JDBC protocol.

Integration Tier 520 hosts the Mobile Network 175 that allows connectivity with various mobile network providers and Partner Interfaces 180 that allows integration with third-party task management applications. The Integration tier communicates with Web Services tier using SOAP protocol.

Status Server 135 carries out the core logic of searching entities based on attributes whose values are time and location bound. In other words, every search may involve a time range, which defaults, for example, to a time range of begin-time="now" and end-time="now+15 minutes." Optionally, a search may involve geographical location of an entity. Status Server also carries-out attribute updates by entities, which may be effective over a time-range, which defaults to begin-time="now" and end-time="now+15 minutes." Temporal search of entities based on attribute values over a period of time is accomplished by in-memory indexing of attribute values over time-range. The indexing will be kept manageable and efficient by remembering time-ranges that are current and in the future. An attribute's value over past range will be removed at the time of update. At the time of entity attribute value update, status server will also check for any pending item requests for the entity. If there are any, the status server evaluates such item requests and if any of them results in a success, posts a notification event to the Event Bus 155 for further processing by Notification Server 145.

Timed Tasks Server 140 is an enterprise task scheduling server, supporting the status server for scheduling time-based notification tasks. When the timer for a scheduled task expires, timed task server makes a callback to Status Server 135 with enough information regarding the task. Status server then performs the task, which may result in evaluating a specific item request and potentially notifying the interested entity. Notifying the interested entity is accomplished by posting a notification event on the Event Bus 155.

Notification Server 145 picks up and processes notification events from the Event Bus 155. When the Event Bus is empty, the Notification Server stays idle. When a notification event gets successfully posted from the Event Bus, the Notification Server composes the notification message and sends out the notification message to the interested entity through Communications Server 150.

Communications Server 150 is used to deliver messages to the recipients through various communications channels, such as phone, fax or email.

Event Bus 155 is the communication channel between the Status Server and the Notification Server. Whenever Status Server 135 needs to send a notification to an interested entity, Status Server posts a notification event that has enough information about the message and the interested entity, to the Event Bus. Notification Server 145 picks up the notification event, constructs the notification message, and sends it to the Communications Server 150 for delivery.

Location Data 162 is a geographic information system (GIS) that indexes the items based on their location coordinates and allows searching of items relative to their geographical position.

Figure 9:
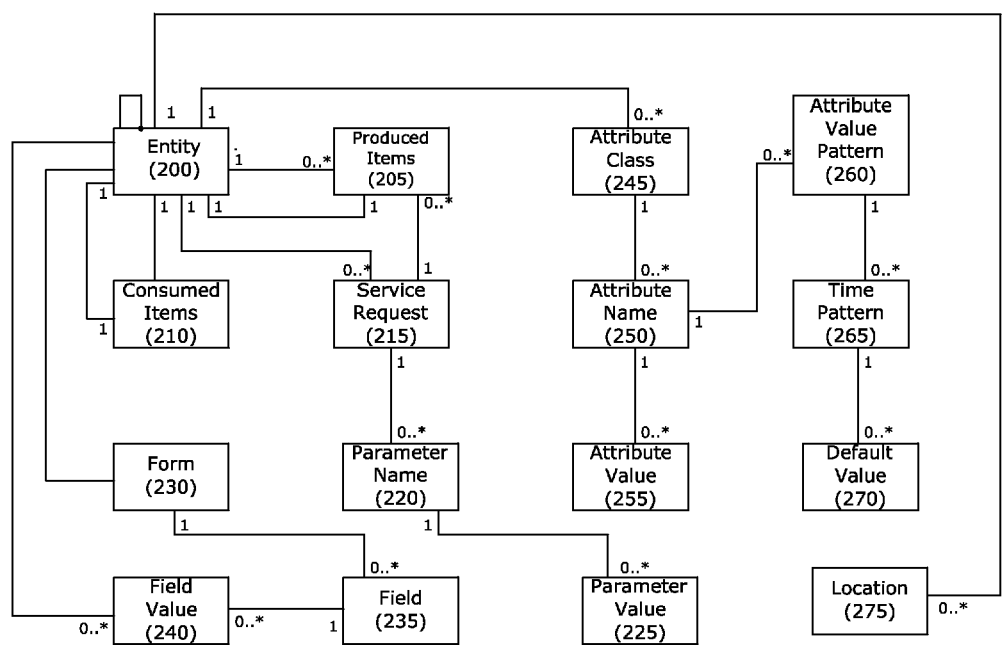
FIG. 9 shows an exemplary logical data model of the system

FIG. 9 depicts the logical data model of the system. Entity 200 consists of a name and a set of attributes where each attribute is a name 250, value/s 255 pair where the value/s are over a range of time. The default attribute value/s may be specified using attribute-value-patterns 260. An entity may be associated with a location 275 that captures the geographical coordinates and address.

An entity may be associated with a collection of other entities known as produced 205 entities and consumed 210 entities. An entity may also be associated with forms 230 that allow interaction between the producer and the consumer. Forms are composed of zero or more form-fields 235. An entity may also be associated with item requests 215 that allow descriptions of items. The basic function of an item request is to identify matching items based on the item description.

Attribute Class 245 is used to classify attribute/value pairs of an entity into groups based on business criteria. Attribute Name 250 contains the name and type of an attribute that can have zero or more attribute values associated with it. Attribute Value 255 is the actual value of an attribute over a period of time.

Attribute Value Pattern 260 is organized by effective date and defines the default values for an attribute over a period as defined in a Time Pattern 265. For example, one can specify daily, weekly or monthly default values that can be used repetitively.

Time Pattern 265 specifies the time pattern, such as daily, weekly or monthly. The Default Values 270 thus specified are used repeatedly daily, weekly or monthly respectively.

The values of an attribute can be specified by the producing entity indirectly through a default value pattern or directly by overriding the default value. The consumer can view the effective value in real time.

Default Value 270 specifies the default value of an attribute over a period of time. If an actual value of an attribute for a given period of time is absent, the system will use the default value, if any, that is applicable for the attribute over that specific period of time.

Location 275 captures the address and geographical coordinates of entities allowing geographic location based search. The geographical coordinates of an address can be obtained by querying public geographical information systems (GIS). Items can be searched by considering user's current location or a specified location. The search results depict services, products, events which are closer to the specified location. A location request can be launched by the Mobile Phone Locator 122 to figure out the current location information of a particular user. Mobile Phone Locator sends a request to the user's mobile or mobile network which in turn responds back with its location. The location can be a close approximation of user's mobile geographical position as detected by a satellite or cell tower. Once the response is received, the system interacts with the location data (GIS) 162 to search for needed items.

Produced 205 associates two entities, one as producing entity and the other as an item produced. The relationship between the producing entity and the item may be effective over a period of time. Producing entity can specify when the item is available for consumption. Producing entity can keep track of who is interested in the item produced.

Similarly, Consumed 210 associates two entities, one as a consuming entity and the other as item. Consumed is used to determine and generate the appointment calendar of the consumer and the delivery schedule of the producer. Any change such as cancellation of consumption is notified to the consuming entity and/or the producing entity and the calendars of the consuming entity and the producing entity may reflect the change automatically.

Item Request 215 is a named piece of Parameter Name 220, Value 225 pairs that defines an entity's item request. An item request can be used to search for a list of matching items that an entity is interested in. It is also used to notify interested entities based on the conditions specified in the item request.

Item Request can also be used to specify items of interest such as a request for proposal (RFP) to which interested producing entities can respond.

Form 230 is a named collection of Field 235, Value 240 pairs that defines a form associated with an entity. Form has a specified group, so that every entity that submits the form gets added to that group. Form also can be either published or not. Multiple forms belonging to a single entity are ordered for presentation purposes using the order attribute of the form. The System provides a library of predefined forms for user convenience.

Field 235 is a collection of attributes such as Label, FieldType, Input, Password, Inventory and Order that are used to define a Form Field. Multiple fields belonging to a single form are ordered for presentation purposes using the order attribute of the field.

Field Value 240 associates the value/s entered by an entity with the field belonging to a form.

Figure 10:
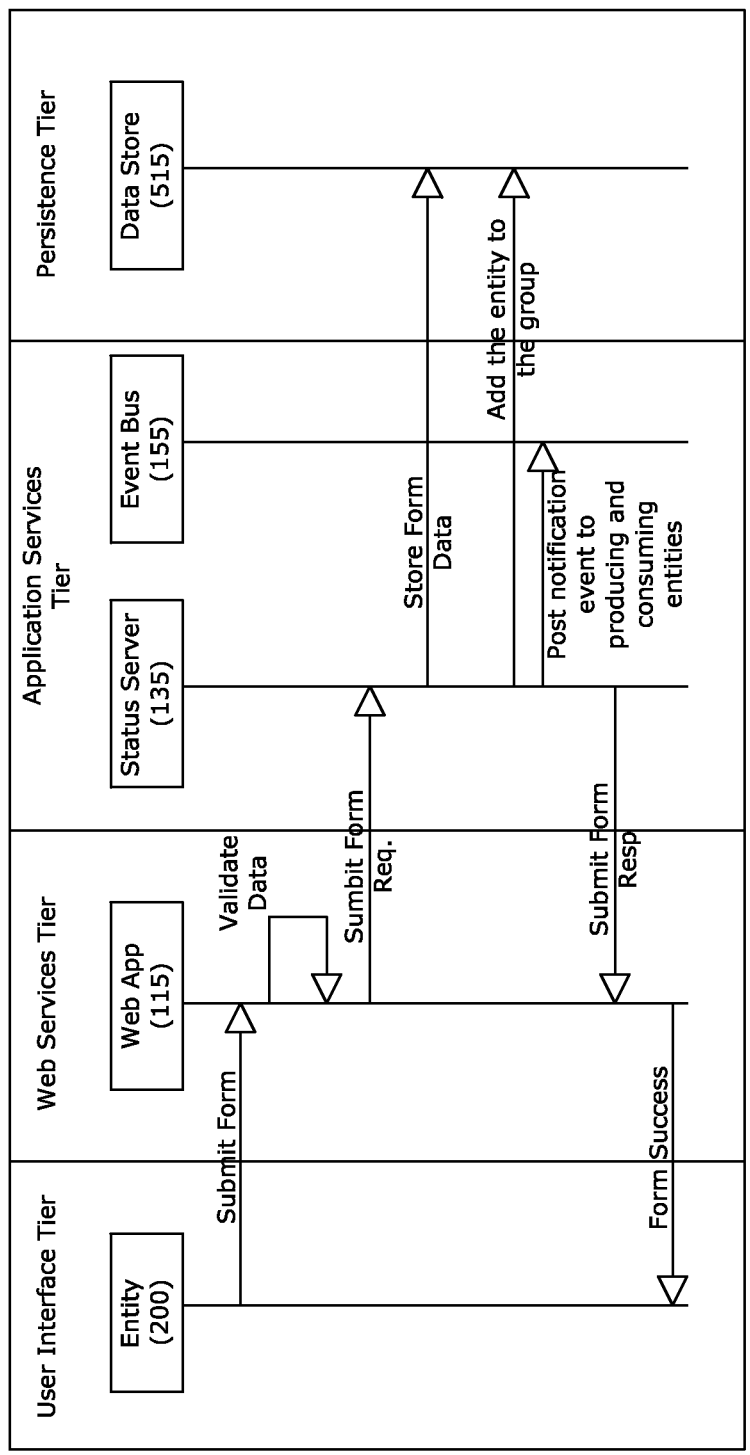
FIG. 10 shows an exemplary sequence diagram of submitting form data

FIG. 10 shows submit form mechanism. When an entity 200 submits a form through the web, the web application 115 validates the form data and submits the form data to the status server 135. Status server stores the form data in the data store 515, adds the submitting entity to the group associated with the group of the form and posts a notification event for the entity that owns the form in context.

Figure 11:
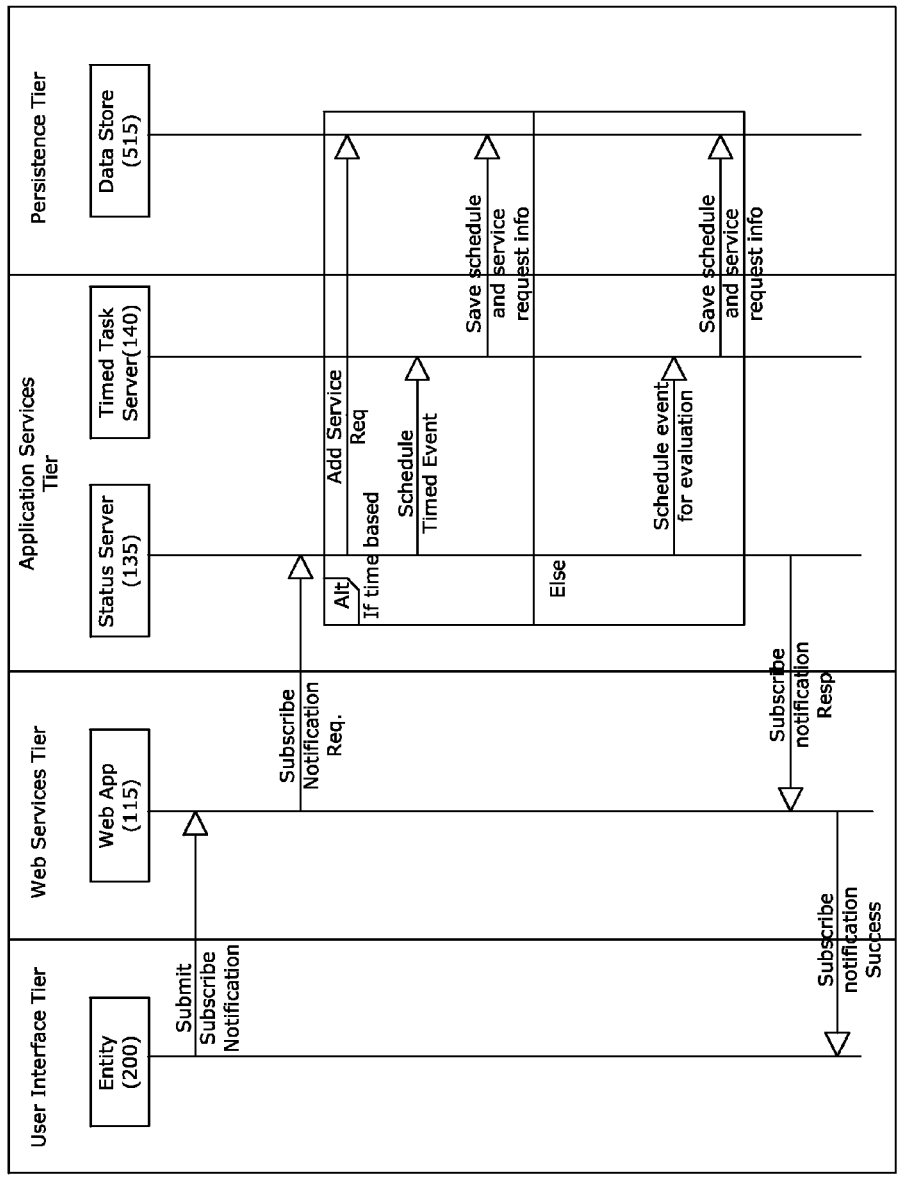
FIG. 11 shows an exemplary sequence diagram of notification subscription

FIG. 11 shows subscription for notification. When entity subscribes for notification through the web, the status server 135 does the following:

1. Creates an item request 215 on behalf of the subscribing entity and saves it in the data store 515.
2. Checks to see if the item request is time based. If true, schedules a timed event in the Timed Tasks Server 145 to evaluate the item request at a specified time in the future. Else, the server figures out the next change in each of item request's attribute's default value in the near future, and schedules a timed event in the timed tasks server to evaluate the item request at that specific time in the future.

The item requests are evaluated whenever an entity manually updates any attribute of an item. Apart from that, item requests must also be evaluated whenever an attribute change happens due to the default load pattern. To handle the automatic attribute change scenario, every time an item request is added, a timed task to evaluate the item requests at the next automatic attribute change is also scheduled.

Figure 12:
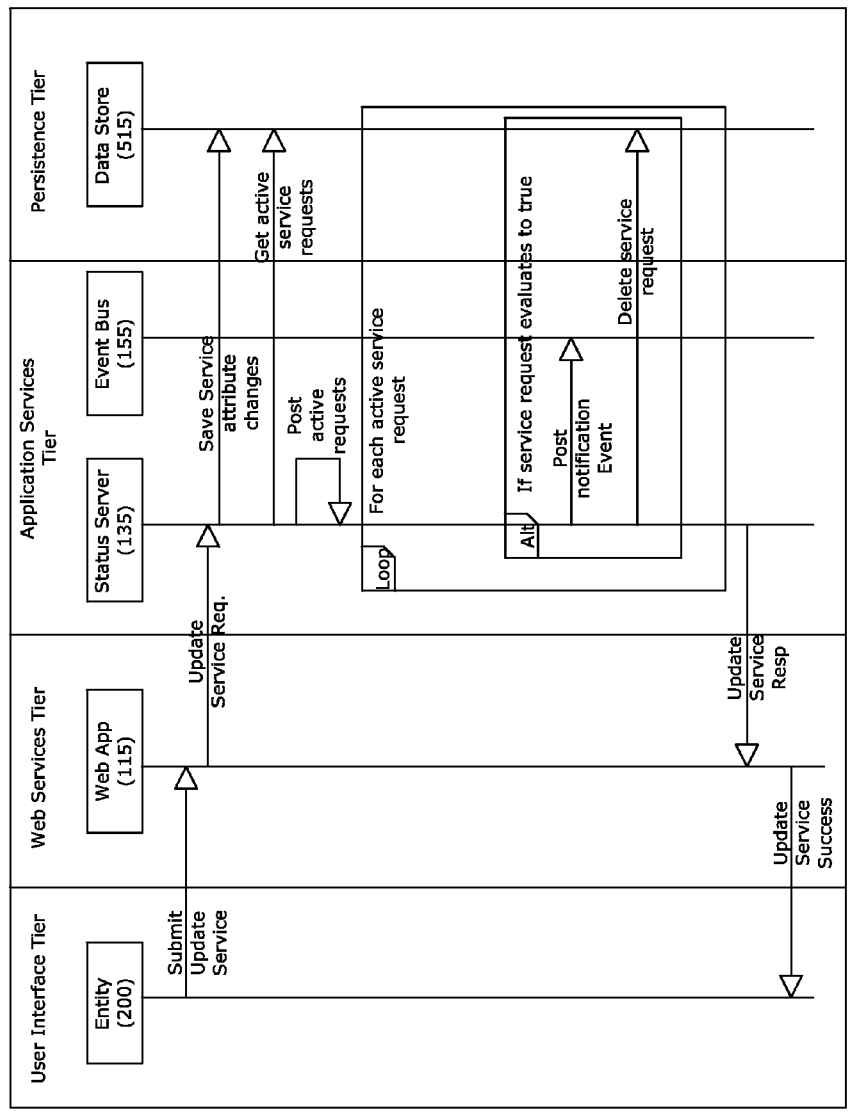
FIG. 12 shows an exemplary sequence diagram of updating status of a goods or service

FIG. 12 shows Update Item mechanism. When an entity updates any of its produced and published entity's attribute value/s, the status server does the following:

1. Saves the attribute value change in the data store 515.
2. Checks to see if there are any pending item requests associated with the produced entity.
3. For each pending item request, the status server does the following:
   A. Evaluate the item request.
   B. If the evaluation results in true, then post a notification event on the event bus 155 and delete the item request from the produced entity.

Figure 13:
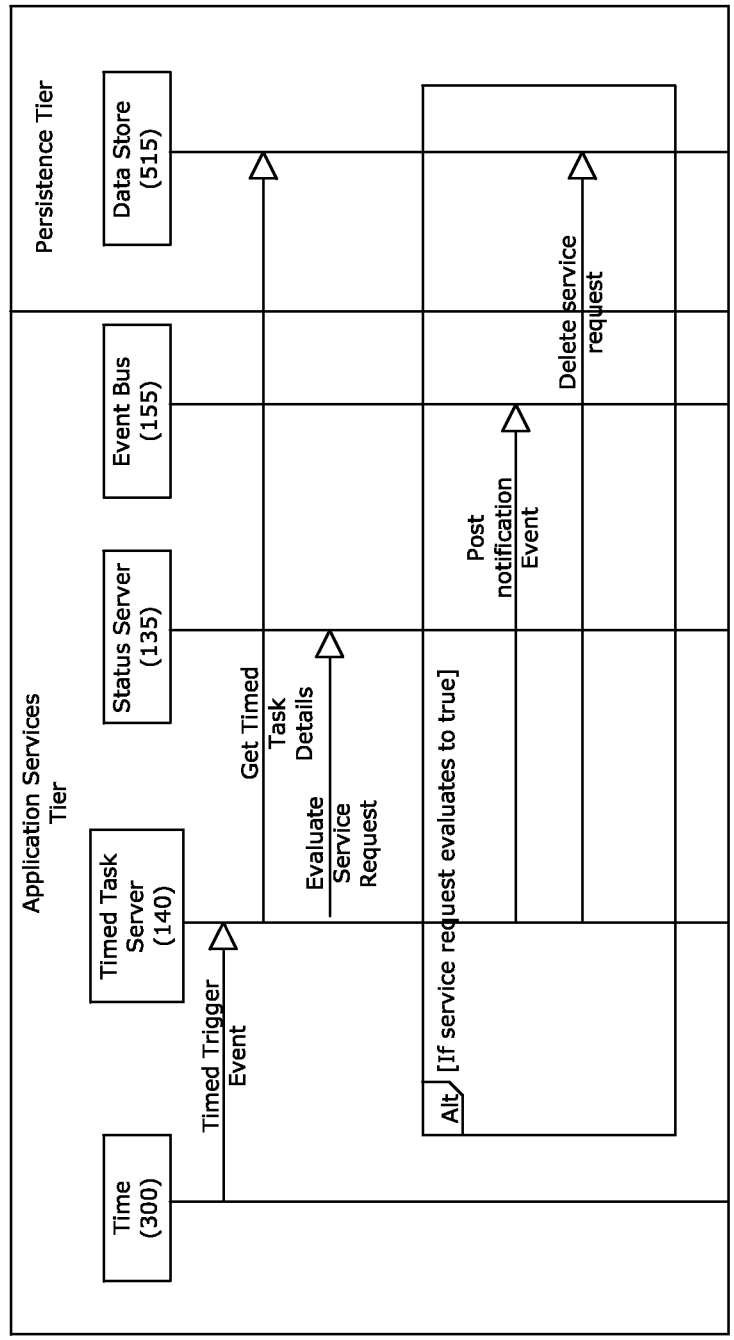
FIG. 13 shows an exemplary sequence diagram of triggering mechanism for timed tasks

FIG. 13 shows the Triggering Mechanism for Timed Tasks. When the timed task server 140 triggers a previously scheduled timed event, the timed task server calls back Status Server 135 to evaluate the relevant item request. Status Server evaluates the item request and if the evaluation results in true, posts the notification event on the event bus 155 and removes the item request from its associated produced item.

Figure 14:
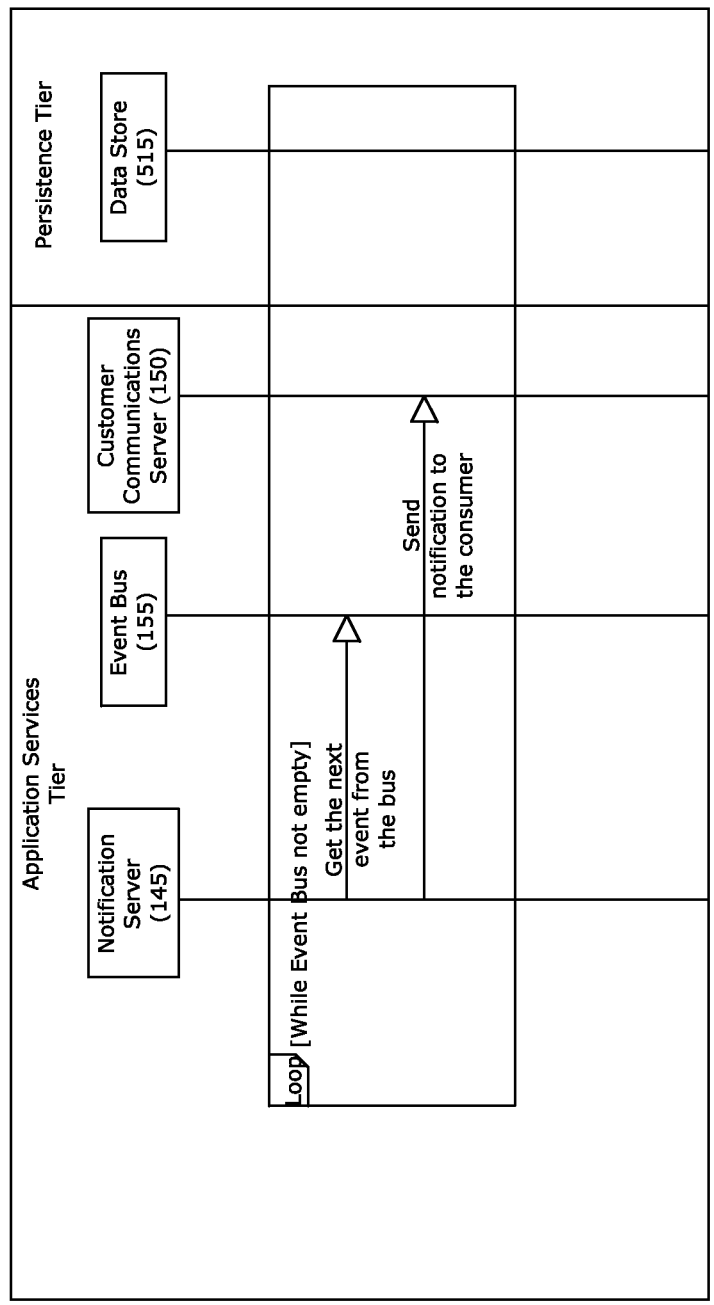
FIG. 14 shows an exemplary sequence diagram of event bus processing
Figure 15:
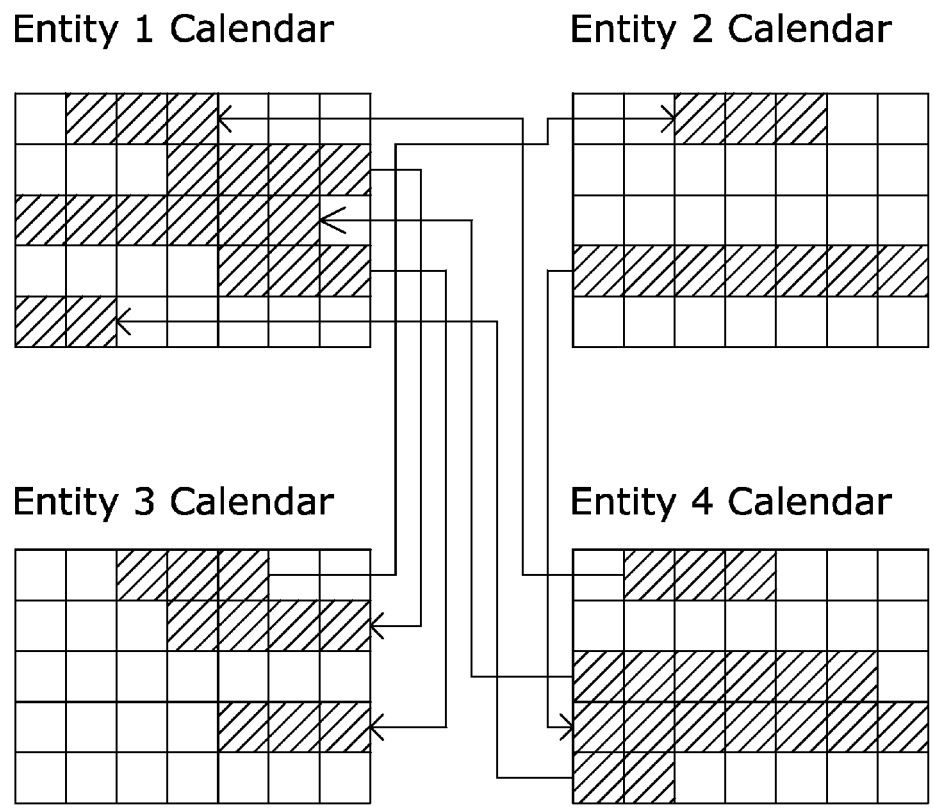
FIG. 15 is an illustration of a linked calendar management
Figure 16A:
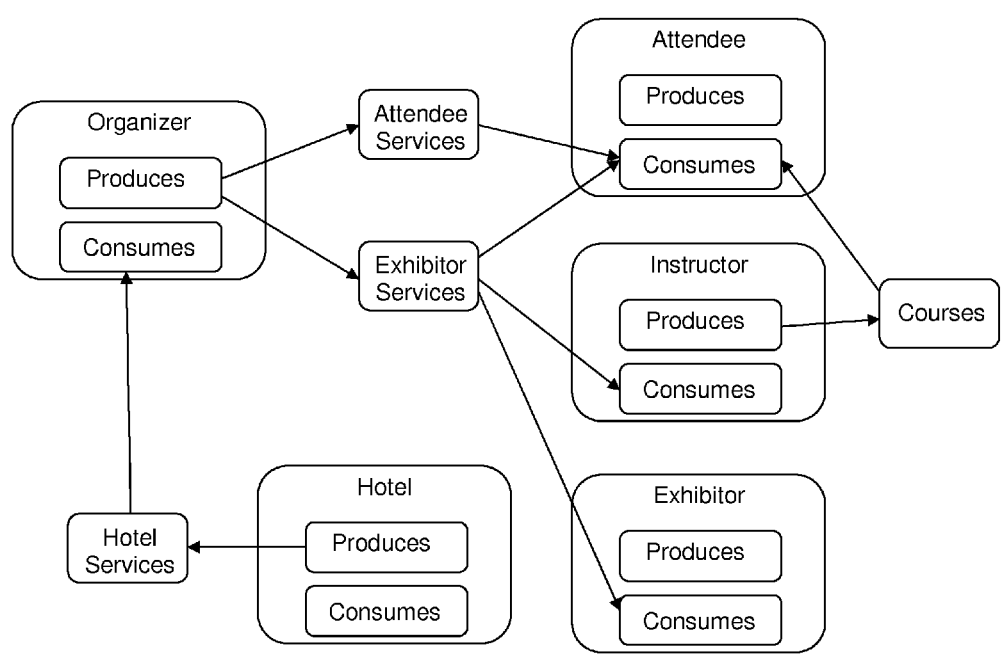
FIG. 16a shows entity an exemplary entity diagram of the exhibition use case in Example 6
Figure 16B:
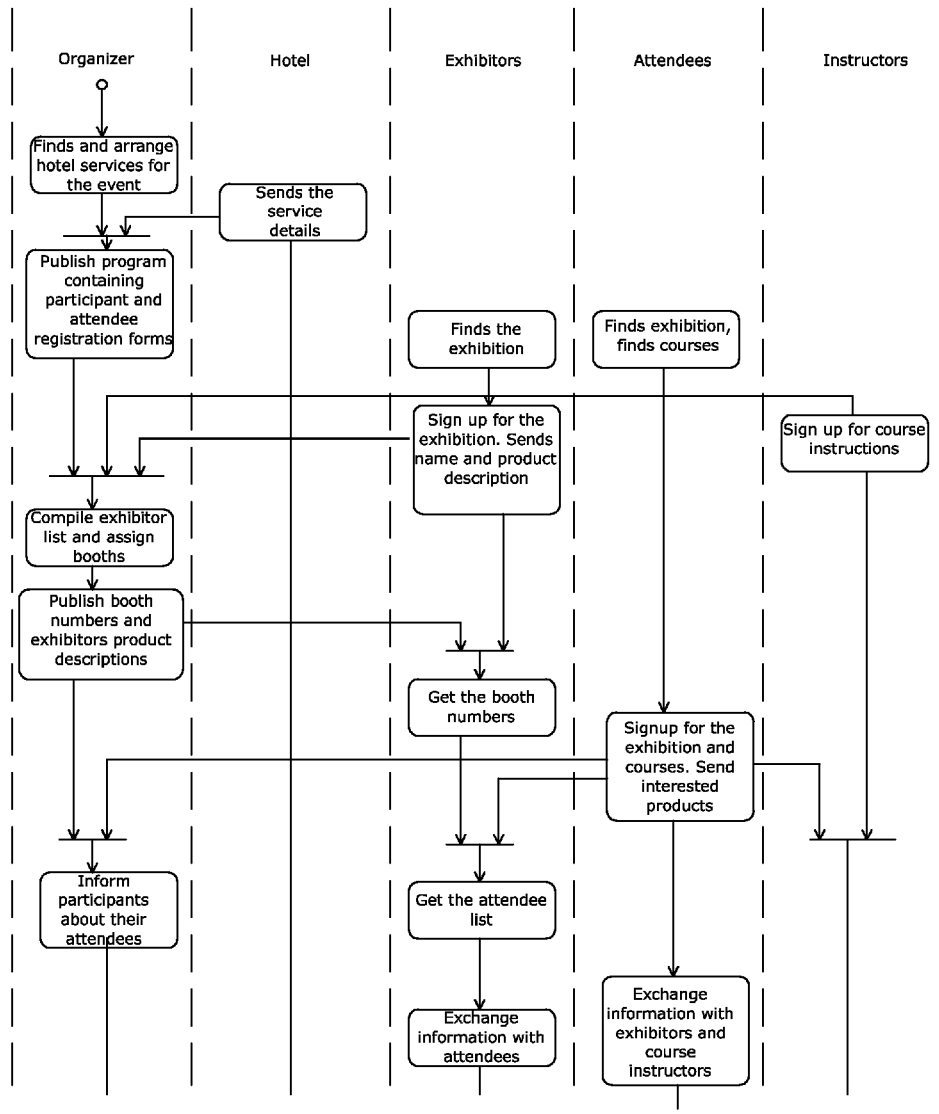
FIG. 16b and FIG. 16c show an exemplary activity diagram of the exhibition use case in Example 6
Figure 16C:
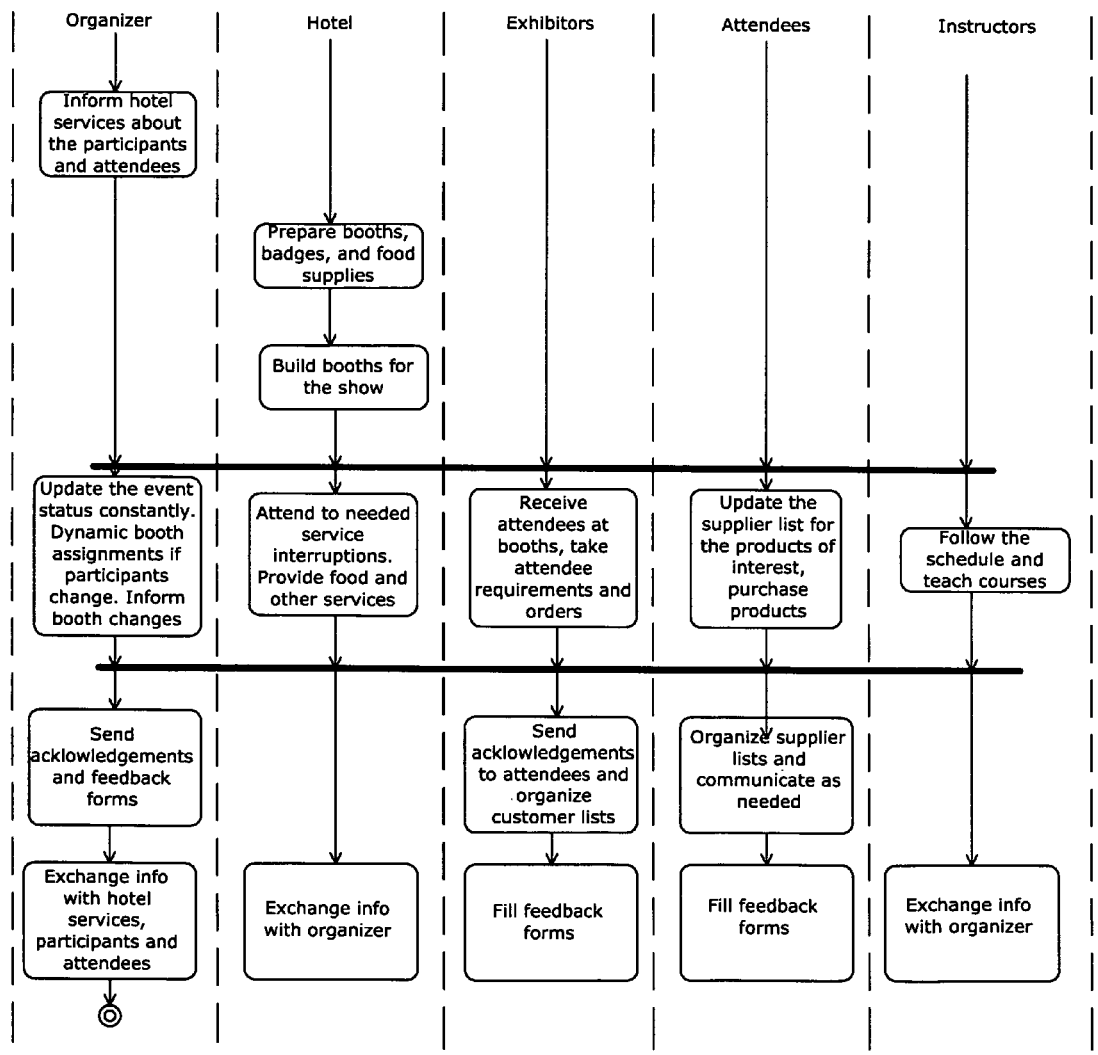
Figure 17A:
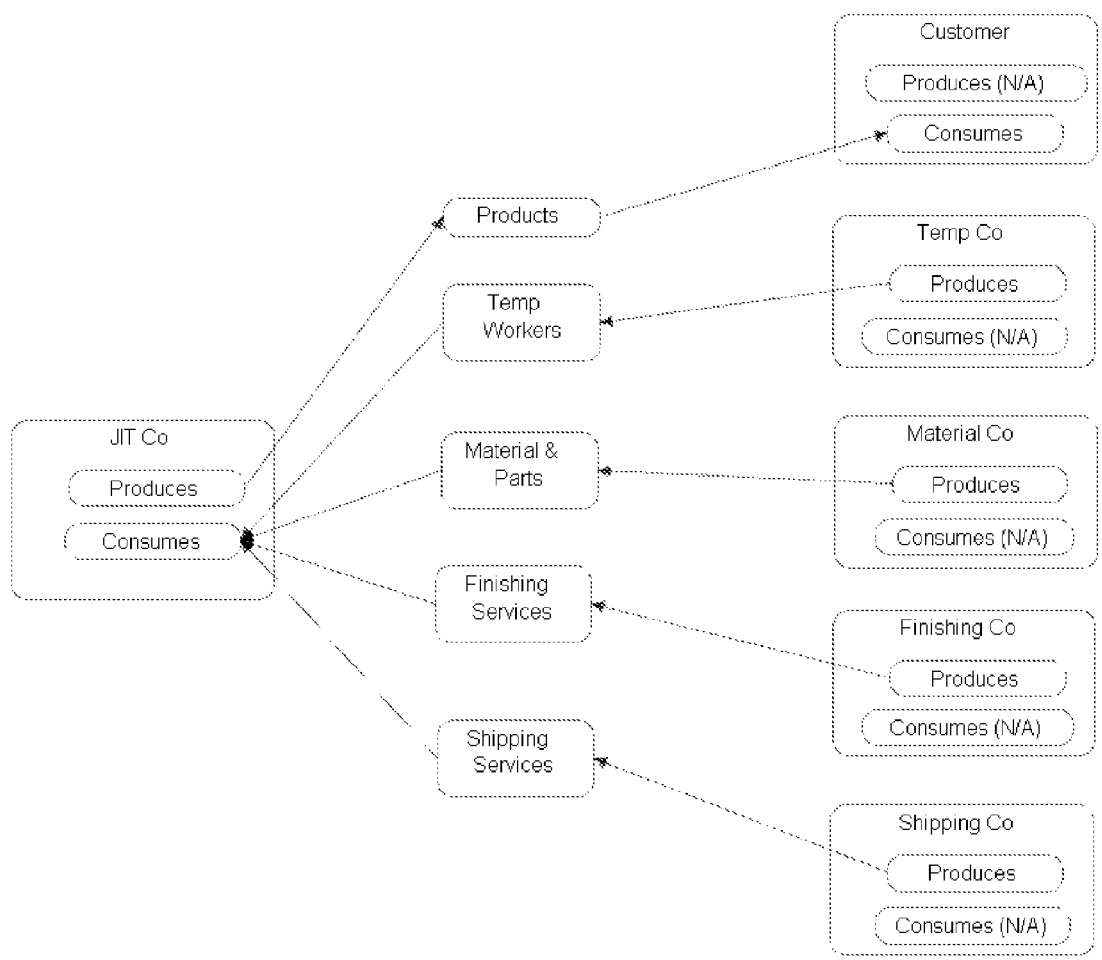
FIG. 17a shows an exemplary entity diagram of the just-in-time manufacturing use case in example 7
Figure 17B:
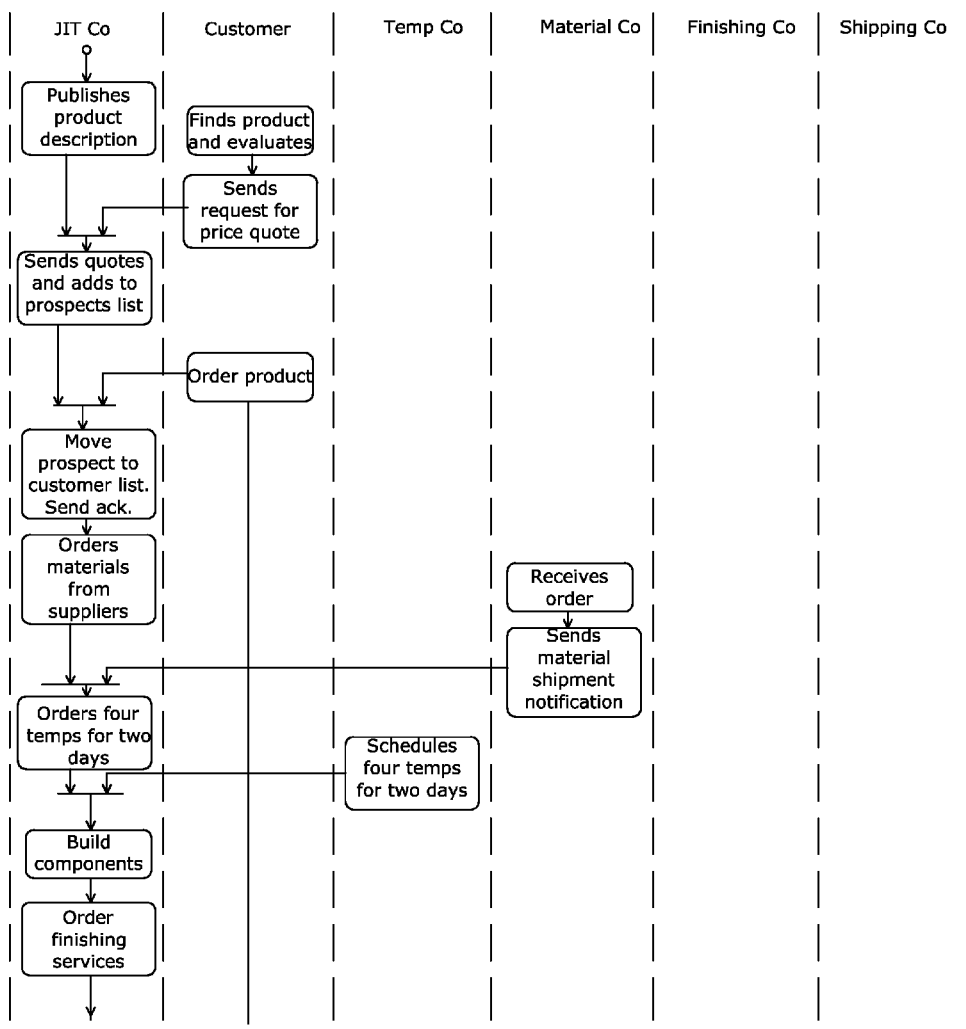
FIG. 17b and FIG. 17c show an exemplary activity diagram of the just-in-time manufacturing use case in Example 7
Figure 17C:
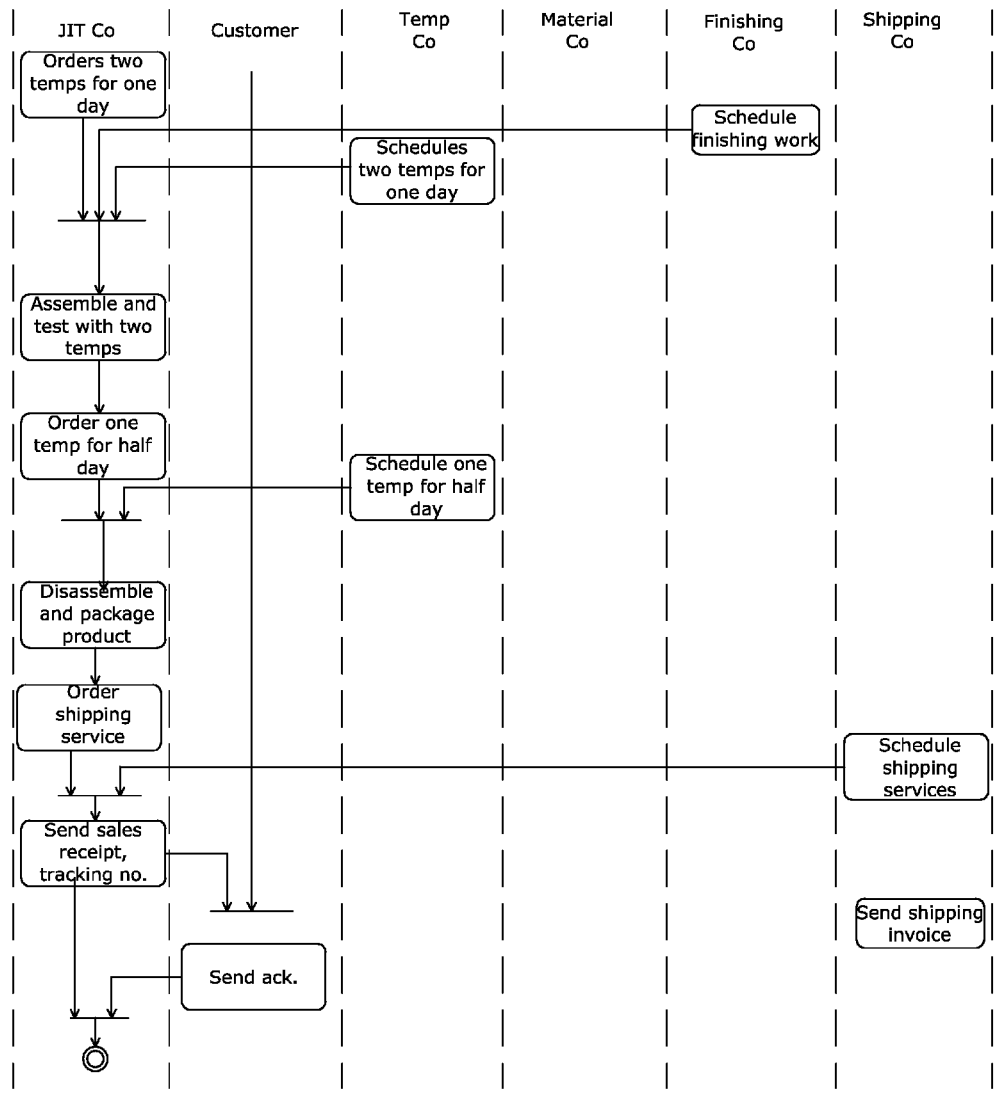

FIG. 14 shows the Event Bus Processing. When a notification event gets posted on the Event Bus 155, Notification Server 145 picks up the event, constructs the relevant message and sends it to the Communications Server 150 for delivery to the interested entity. The notification event contains the source entity, the destination entity and other relevant notification data.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A system for people's task management, comprising:
   a network;
   a plurality of user computing devices, wherein each of said plurality of user computing devices is connected to said network;
   a task management computing device, connected to said network, comprising instructions, which when executed on said computing device, are configured to:
   present a user interface to said user computing devices, wherein said user interface allows a user to create a plurality of software entities, wherein each of said plurality of software entities comprises a computer representation of a single person, a group of people, a business, an organization or an institution and comprises a unique identification, a first list of one or more produced items and a second list of one of more consumed items;
   establish a communication path between a first entity having a particular item in its first list and one or more second entities having said particular item in its second list; and
   perform a task by exchanging data between said first entity and said second entities, using said established communication path.

2. The system of claim 1, wherein said user interface is configured to create a complex entity by aggregating at least two of said plurality of entities, wherein a first list of said complex entity is created based on said first lists and said second lists of said at least two entities and a second list of said complex entity is created based on said first lists and said second lists of said at least two entities.

3. The system of claim 2, wherein said first lists of said at least two entities comprises at least one item not in said first list of said complex entity, wherein one of said at least two entities produces said at least one item and a second of said at least two entities consumes said at least one item.

4. The system of claim 2, wherein said second lists of said at least two entities comprises at least one item not in said second list of said complex entity, wherein one of said at least two entities produces said at least one item and a second of said at least two entities consumes said at least one item.

5. The system of claim 1, wherein said instructions are further configured to:
   generate a third entity, comprising a unique identification, a first list and a second list, wherein an item in its first list is also in said second list of said first entity;
   establish a communication path between said third entity and said first entity;
   perform a task by exchanging data between said third entity and said first entity.

6. A method of people's task management using a network of computing devices, comprising:
   using a first software component on a computer to present a user interface on said computer, allowing creation of a plurality of software entities, each of said plurality of software entities comprising a computer representation of a single person, a group of people, a business, an organization or an institution and having a unique identification, a first list of one or more produced items, and a second list of one or more consumed items, wherein each of said produced items and said consumed items represents a good or service;
   using a second software component which establishes a communication path between a first entity having a particular item in its first list and at least one second entity having said particular item in its second list using said network; and exchanging data between said first entity and said second entities, using said established communication path to perform a task.

7. The method of claim 6, further comprising: creating a complex entity by aggregating at least two of said plurality of entities, wherein a first list of said complex entity is created based on said first lists and said second lists of said at least two entities and a second list of said complex entity is created based on said first lists and said second lists of said at least two entities.

8. The method of claim 7, wherein said first lists of said at least two entities comprise at least one item not in said first list of said complex entity, wherein one of said at least two entities produces said at least one item and a second of said at least two entities consumes said at least one item.

9. The method of claim 7, wherein said second lists of said at least two entities comprise at least one item not in said second list of said complex entity, wherein one of said at least two entities produces said at least one item and a second of said at least two entities consumes said at least one item.

10. The method of claim 6, further comprising:
using said user interface to create a third entity, comprising a unique identification, a first list and a second list, wherein an item in its first list is in said second list of said first entity;
using a software component to establish a communication path between said third entity and said first entity;
exchanging data between said third entity and said first entity over said established communication path to perform a task.

\* \* \* \* \*